(No Model.)
G. L. SUTTON.
FENCING MACHINE.
No. 351,078. Patented Oct. 19, 1886.
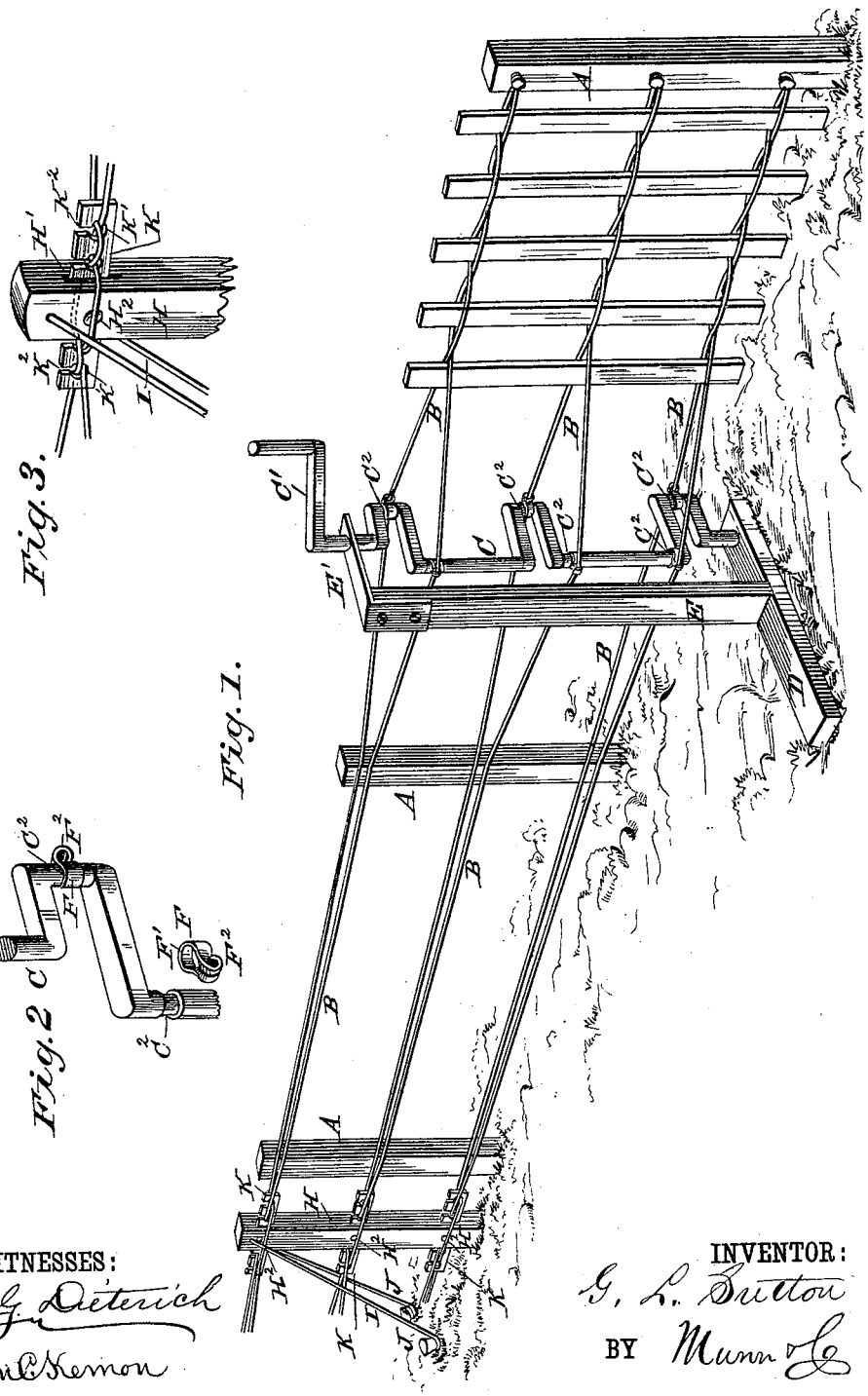
WITNESSES:
Fred G. Dieterich
John E. Kemon
INVENTOR:
G. L. Sutton
BY Munn & Co
ATTORNEYS.

UNITED STATES PATENT OFFICE.

GEORGE L. SUTTON, OF PLATTEVILLE, IOWA, ASSIGNOR OF ONE-HALF TO JOSEPH R. STANDLEY, OF SAME PLACE.

FENCING-MACHINE.

SPECIFICATION forming part of Letters Patent No. 351,078, dated October 19, 1886.

Application filed August 12, 1886. Serial No. 210,831. (No model.)

*To all whom it may concern:*

Be it known that I, GEORGE L. SUTTON, of Platteville, in the county of Taylor and State of Iowa, have invented a new and useful Improvement in Fencing-Machines, of which the following is a specification.

My invention consists in an improved machine for making wire and slat or paling fences, and which will be hereinafter fully described and claimed.

Referring to the accompanying drawings, Figure 1 is a perspective view showing my invention as in use. Fig. 2 is a detail view of a part of the crank-shaft and the wire-clutches, and Fig. 3 is a detail perspective view of the tension device.

The same letters of reference indicate corresponding parts in all the figures.

Referring to the several parts by letter, A A A represent the fence-posts, which are set along the line on which the fence is to be constructed.

B B indicate the wires, of which there are three pairs, as shown.

The device for spreading the wires, to permit of the slats being woven or arranged between them, consists of a crank-shaft, C, having the three principal cranks or bent portions formed in it, the lower end of this crank-shaft being journaled in a base-piece, D, which has an upright, E, to the upper end of which is secured an arm, E', in the rearwardly-projecting end of which is journaled the upper portion of the crank-shaft, the upper end of the crank-shaft being provided with a handle or lever, C', by means of which it is rotated. On the straight or vertical portions of the crank-shaft, immediately above and below the three horizontal portions thereof, are formed the annular grooves C², which form bearings for the wire-clutches, and admit of the latter turning readily on the crank-shaft, these wire-clutches F being formed with the circular body portions F', which encircle the crank-shaft and turn freely thereon, and the hooks F², which hold the several strands of wire as the crank-shaft is rotated to spread the wires to admit of the palings being woven between the same.

In operation the ends of the several wires are fastened to the first post, and the crank-shaft is placed in position, as shown in Fig. 2 of the drawings, and the wires hooked into the hooks of their respective clutches on the crank-shaft, when by turning the crank-shaft by its handle it will be seen that the several pairs of wires will be spread alternately in opposite directions, so as to permit of the palings being woven in between the wires in their operative positions, as shown in the left-hand portion of Fig. 1, and as this peculiarly-constructed crank-shaft comes to a dead-center every half-turn it is very easy to manipulate and can be readily worked by one man. It is exceedingly simple and strong in construction, there being no cogs or springs whatever about it. It will be seen that as the crank-shaft is rotated the wire-clutches will turn readily, so as to always hold the wires without twisting them, no matter how rapidly the shaft may be rotated, the clutches being exceedingly simple and effective in construction. From the crank-shaft or spreading device the wires pass to the tension device, which consists of an upright, H, which is set in the ground at the end of the proposed fence and stayed back by the ropes I, extending to stakes J, driven in the ground. This upright is formed with the three transverse openings H', in which are secured, by the transverse bolts H², the tension-plates K, one of which is shown in detail in Fig. 3 of the drawings. Each of these tension-plates consists of a flat rectangular strip or plate, of wood or metal, having formed in it the transverse circular apertures K', connected by a slot, K², with the upper surface or edge of the plate, so that the wires may be introduced into the said apertures by sliding them down through the slots K². These plates are secured by the bolts H² in the transverse openings H' of the upright H, extending half on each side of the upright, as shown, and the pairs of wires leading from the crank-shaft are slipped into the first slot and aperture of their respective plate, crossing each other in the said aperture, and are then crossed in a similar manner in one or more of the remaining slots and apertures, according to the degree of tension which may be required. As the crank-shaft rotates and weaves the wire in between the slats, or rather spreads the wires, so as to permit of the slats or palings being placed in position between the wires, the tension-plates permit the wires to slide through them, the wires being adjusted in a sufficient number of slots and apertures to obtain the requisite tension.

From the foregoing description, taken in connection with the accompanying drawings, the construction, operation, and advantages of my invention will be readily understood. It will be seen that the several parts of the apparatus are simple and strong in construction, and therefore not liable to break or get out of order, while at the same time they are exceedingly efficient in their operation.

Having thus described my invention, what I claim, and desire to secure by Letters Patent, is—

1. The combination, with the treble crank-shaft having the annular grooves, arranged as described, of the wire-clutches having the circular body portions and the end hooks.

2. The combination, with the base-piece and the upright having the arm at its upper end, of the treble crank-shaft having the annular grooves, arranged as described, and the wire-clutches having the circular body portions and the end hooks.

3. The combination, with the upright having the transverse apertures, of the tension-plates having the slots and apertures, arranged as described.

4. The combination, with the base-piece and the upright having the arm at its upper end, of the treble crank-shaft having the annular grooves, arranged as described, and the wire-clutches having the circular body portions and the end hooks, and the tension-plates having the transverse apertures and the slots leading thereto, and secured in the upright in the manner set forth, substantially as described.

GEORGE L. SUTTON.

Witnesses:
W. J. W. TOWNSEND,
DAVID KILLION.